United States Patent [19]

Haley

[11] 3,734,773
[45] May 22, 1973

[54] PROCESS FOR SELECTIVELY PURIFYING SUGAR BEET DIFFUSION JUICE AND BY-PRODUCT RECOVERY OF VALUABLE ORGANIC ACIDS THEREFROM

[76] Inventor: Boyd E. Haley, 428 W. Spring Street, West Haven, Conn.

[22] Filed: Aug. 2, 1971

[21] Appl. No.: 167,995

[52] U.S. Cl. .................... 127/48, 127/46 R, 127/50, 127/56, 260/527 R, 260/528
[51] Int. Cl. ...... C07c 53/00, C07c 55/00, C13d 3/00
[58] Field of Search .................... 127/48, 50, 46 R, 127/56; 260/527 R, 528

[56] References Cited

UNITED STATES PATENTS

| | | | |
|---|---|---|---|
| 2,776,229 | 1/1957 | Peterson | 127/50 X |
| 1,988,923 | 1/1935 | Teatini | 127/50 |
| 2,664,441 | 12/1953 | Owens | 260/527 R |
| 1,876,491 | 9/1932 | Foster | 127/50 |

Primary Examiner—Morris O. Wolk
Assistant Examiner—Sidney Marantz
Attorney—Greek Wells, Richard J. St. John and David P. Roberts

[57] ABSTRACT

A process for selectively purifying sugar beet diffusion juice in which the raw diffusion juice is first neutralized to minimize inverted sugar formation and stabilize the colloidal content without precipitating the soluble organic acids. The neutralized diffusion juice is then subjected to high centrifugal forces to separate the colloidal and particulate content from the diffusion juice. After the colloidal and particulate solids are removed, the clarified diffusion juice is contacted with a stoichiometric equivalent or slight excess of lime based upon the soluble organic acid concentration in the diffusion juice to react with the soluble organic acids to form insoluble calcium salts of the organic acids. The insoluble calcium salts of the organic acids are then removed from the diffusion juice. The diffusion juice may be further purified as needed. The insoluble calcium salts of the organic acids are then placed in an aqueous solution such as hot water. Carbon dioxide gas or other suitable carbonate ion producing agent is dissolved in the hot water to release the organic acids and produce a calcium carbonate precipitate. The dissolved organic acids are then selectively recovered by conventional means.

5 Claims, 1 Drawing Figure

Patented May 22, 1973 3,734,773
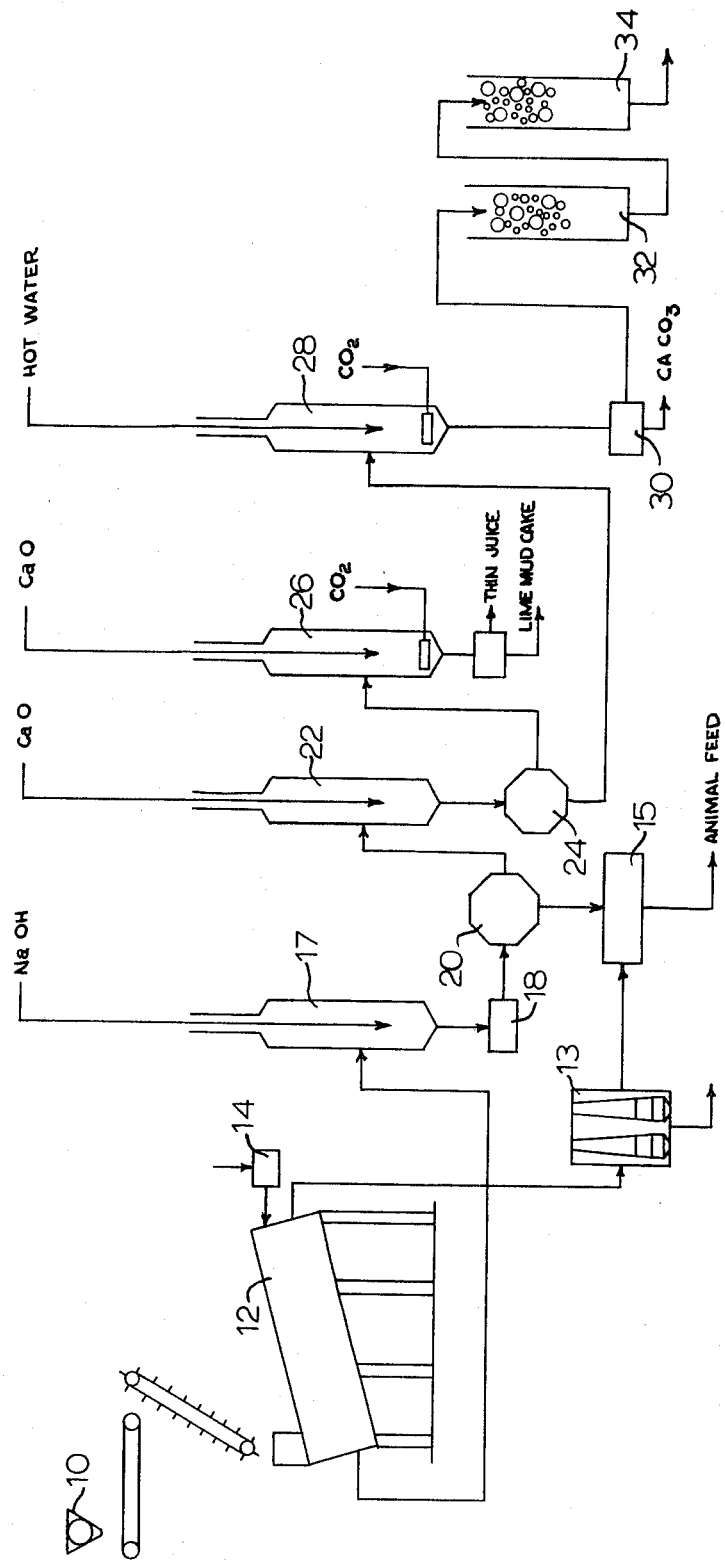

PROCESS FOR SELECTIVELY PURIFYING SUGAR BEET DIFFUSION JUICE AND BY-PRODUCT RECOVERY OF VALUABLE ORGANIC ACIDS THEREFROM

BACKGROUND OF THE INVENTION

This invention relates to beet sugar manufacture and more particularly to processes for purifying the diffusion juices and recovery of organic acids contained therein.

Generally modern beet sugar manufacture is conveniently separated into five stages or steps: (1) diffusion, (2) juice purification, (3) evaporation, (4) crystallization, and (5) recovery of sugar from molasses.

The composition of sugar beets varies widely, depending on the genetic strain, agronomic factors of soil and fertilization, weather conditions during growth, incidence of plant disease, degree of maturity and the treatment between harvesting and slicing. The percentage of sugar in mature beets ranges from 10–22 percent with 15–16 percent being the medium values. A mature beet generally contains about three-quarters water. The beet has a liquid or juice phase and an insoluble or solid phase. The juice contains approximately 25 percent by weight of dissolved solids, the largest component of which is sucrose.

The other water-soluble organic constituents are separated into equal quantities of nitrogenous and nitrogen free compounds. Included in the nitrogen-free compounds besides sucrose, are small amounts of glucose and fructose and raffinose and ketoses. The beet juice contains appreciable amounts of the water-soluble citric acid, oxalic acid, malic acid, acetic acid and lactic acid and lesser amounts of succinic acid, glycolic acid, galacturonic acid, tartaric acid, formic acid, fumaric acid and butyric acid. The juices also contain pectic material, saponins and vegetable fats made up of lecithin, oleic, palmitic and erucic acids.

The largest fraction of nitrogenous compounds is protein. The nitrogenous organics, which cannot easily be coagulated or precipitated, are generally classed as "interfering" or "harmful" nitrogen. The organic base, betaine, is the largest individual component, followed by the amides mostly glutamine and asparagine-amino acids, purines, pyrimidines, and ammonia and nitrate.

The inorganic constituents, totaling about 0.5 percent of the whole beet, include the cations of potassium, calcium, magnesium and sodium and anions phosphate, chloride and sulfate.

In the typical modern plant, the clean sugar beets are run through a beet slicer to form long, thin strips or cossettes. After weighing, the cossettes pass into a continuous diffuser usually of the slope-type to extract the sugar from the cossettes with a warm water solvent from a water supply. The cossettes are propelled up the slope by scrolls with perforated plate flights. The solvent (warm water) enters at the top of the diffuser and percolates by gravity through the cossette mass, leaching out the sucrose and the water soluble materials as the solvent proceeds counter-current to the cossettes. Generally, the diffuser is heated by steam to increase the extraction efficiency of the solvent. Detrimentally, however, the increased temperature causes additional amounts of colloidal matter, especially pectins, to be added to the juice. The sucrose enriched juice leaving the diffuser is known in the industry as diffusion juice or raw juice. The depleted cossettes leaving the upper end of the diffuser are known as pulp. The diffusion process is approximately 98 percent efficient with the diffusion juice containing 10–15 percent sucrose.

The diffusion juice is clouded and contains a considerable amount of colloidal particles. The color of the diffuser juice is usually gray and changes to a dark gray or almost black hue on contact with air. The diffuser juice normally has a pH of between 6.2 and 6.5 and leaves the diffuser at a temperature between 60°–75° C.

The non-sucrose content of the diffusion juice is related to the quality of the beets and the conditions under which the sugar is extracted in the factory. Besides the water and sucrose, the diffuser juice contains solid impurities which are freely dissolved, suspended or colloidal in nature. The colloidal and particulate material, in particular, make it very difficult to concentrate the diffusion juice or to crystallize pure sucrose from the juice. The inverted sucrose (glucose and fructose) in the juice normally ranges from 0.4 to 0.8 percent of the dissolved solids.

The chief aim of juice purification is to efficiently remove the impurities from the juice so that a high quality white sugar can subsequently be formed with a minimum of sugar loss in the molasses or in the impurities removed. Generally, the actual operating conditions of the juice purification process is a compromise between obtaining a good quality thin juice and ease of sludge or mud separation.

Since the late 1800's, the classical process for purifying or defecating the diffusion juice has been the lime-carbon dioxide purification process which includes the steps of: (1) pre-liming or pre-defecation, (2) main-liming, (3) first carbonation and (4) second carbonation.

Prior to pre-liming, the diffuser juice is usually screened to remove the suspended large particles and heated to an elevated temperature in a juice heater.

The purpose of pre-liming is to alkalize the juice to stabilize the colloidal and particulate material at a pH of 8.0 to 8.3 and to precipitate certain non-sugars, among which are acid anion groups with relatively insoluble lime salts such as phosphate, sulfate and certain of the organic acids, proteins, and their moieties and colloidal substances which are not adequately removed in main-liming. Generally, this is appreciably accomplished by the addition of a liming agent of 0.2 – 0.3 percent CaO by weight to the juice. The lime is added in the form of saccharate milk or milk of lime. The precipitate produced in pre-liming includes both ionic and colloidal types. The first ionic reaction of lime is the neutralization of acidity. Since the solubility of the formed lime salts are rather low, large amounts of lime are not required. The colloidal reactions of the protein and pectins are quite complicated and difficult to predict.

Proteins of the diffusion juice when precipitated with lime from a colloidal slimy precipitate which settle very slowly is rather difficult to filter. Furthermore, proteins are able to depress the activity of the calcium ion and increase the apparent solubility product of calcium carbonate during carbonation. Pre-liming, if properly conducted, provides for the effective coagulation of proteins. When the lime is added rather slowly a somewhat more compact precipitate forms which settles somewhat more readily and is somewhat easier to filter. On an overall basis, approximately 10 percent of total CaO utilized in the purification process is added to the screened diffusion juice during pre-liming.

The liming step includes the addition of excess amounts of CaO to the diffusion juice to substantially increase the pH of the juice to destroy inverted sugar or the saponification of amides and increase sedimentation and filterability of the precipitate during the first carbonization. Large quantities of CaO are added to the juice, between 2 percent and 3 percent by weight of the juice, to complete the destruction reaction and to combine with $CO_2$ to form substantial amounts $CaCO_3$ precipitate during first carbonation to act as a filter aid to increase sedimentation and filterability of the conglomerate precipitate or sludge.

After the liming, when all the possible reactions between lime and non-sugars have taken place, the third fundamental step of first carbonation is introduced. The objective of the first carbonation step is to precipitate with carbonic acid the excess of lime added to the juice and bring the alkalinity of the juice to a desired low level of about 0.1 percent CaO. The precipitated calcium carbonate is important for two reasons; (1) to be a reagent for further chemical purification of the juice, and (2) to act as a filter aid. These two uses make opposing demands on the physical quality of the precipitate formed. To obtain optimum chemical purification, it is desirable to have the calcium carbonate form with a high surface area ratio. However, the rate of filtration and sedimentation are lowered with increased surface area ratios. An increase in the size of the calcium carbonate precipitate, results in a lower surface area ratio but greatly favors sedimentation and filtration. The physical form of the calcium carbonate precipitate depends upon the initial alkalinity of the juice before carbonation, the drop of alkalinity during first carbonation and on the final alkalinity at the conclusion of the first carbonation. Generally, the higher the alkaline end point of first carbonation, the better is the quality of the thin juice produced. However, the lower the alkalinity, the larger the crystalline agglomerates and the more easily the carbonation sludge can be settled and filtered. The carbonation is generally accomplished by gasing $CO_2$ through the solution.

After carbonation the treated juice flows from the carbonation system into a clarifier where separation of the precipitated solids from the juice is effected to form a thin juice and sludge.

The thin juice is heated by a thin juice heater and sent to evaporators to evaporate much of the water from the dissolved sugar content. By evaporation, the percentage of dissolved solids in the juice is raised from 10 – 15 percent to 50 – 65 percent. The overflow from the last evaporation is called thick juice.

The thick juice is then fed to vacuum pans where the liquid is boiled at low temperature to avoid inversion and caramelization to start the formation of sugar crystals. The liquor is either shocked to start crystal formation by the small addition of powdered sugar or it is seeded with finely-milled sugar in a slurry of iospropyl alcohol. When the crystals are of the desired size and number, the mass of crystals and mother liquor, known as massecuite is then discharged from the vacuum pans into a large mixer. From the mixer the massecuite is fed to centrifugals. The centrifugal is in essence, a perforated basket which rotates around a vertical axis at high speeds within an outer collector shell. The liquid surrounding the crystals is spun off and leaves the basket through the perforaters. The remaining crystals are then granulated.

During the purification process a substantial amount of the sucrose is entrained in the carbonation sludge. The carbonation sludge is removed from the clarifier in an underflow line. The underflow lines pass the sludge to rotary drum vacuum filters to remove the juice from the solid material. The solid material forms a waste lime cake or lime mud cake which is subsequently washed several times to re-dissolve the entrained sugar. The waste lime cake contains about 75 percent calcium carbonate, 6 percent organic nitrogen compounds including organic acids, 4 percent of the mineral compounds, a small amount of phosphoric acid equivalent and any filter aids that are discarded with the waste lime. Generally, the waste lime cake is dumped in a lime pond to be sun baked. The dried waste lime cake, because of its high concentration of calcium carbonate, is sometimes processed through a reclaiming kiln to regenerate lime and $CO_2$ gas. No attempt is made to recover the organic matter of the cake other than to use it as a partial fuel source for drying and calcining in the reclaiming kiln.

One of the principal objects of this invention is to provide a sugar beet diffusion juice purification process for removing impurities in a selective manner to be able to recover organic acids as by-products without substantial subsequent treatment.

An additional object of this invention is to provide a diffusion juice purification process that greatly reduces the amount of precipitate required to be filtered and thereby reduce the filtration capacity required to remove the precipitate.

An additional object of this invention is to provide a diffusion juice purification process to remove the slimy gelatinous colloidal materials from the juice prior to removal of the organic acid impurities to greatly decrease the filtration load and greatly increase the filtration efficiency. Present purification processes require the addition of large excess amounts of lime to the juice to act as a filter aid to overcome the difficulty of filtering gelatinous precipitates. Such additions are not required with this invention.

A further object of this invention is to provide a process for recovering organic acids from sugar beet diffusion juice without adversely affecting the production of sugar.

An additional object of this invention is to provide a process for purifying sugar-beet diffuser juice to greatly reduce the extent of liming, first and second carbonization and sulfitation required to purify the juice. This advantage enables the juice to be purified with equipment of considerably less capacity which greatly reduces the initial capital costs in plant expenditure, reduces maintenance and lowers operating costs.

A further object of this invention is to provide a process for purifying sugar beet diffusion juice to remove a considerably greater amount of the organic acid impurities to provide a purer thin juice than presently obtained. Such removal results in less evaporator scaling than is presently encountered.

An additional object of this invention is to increase the sucrose recovery by decreasing the amount of sucrose removed during the purification process either by way of sucrose destruction by liming or by entrainment in the lime mud cake.

A further object of this invention is to provide such a purification process which increases the flexibility of the overall sugar recovery process to respond to fluctuations in the quality of the sugar beet and other process variables.

An additional object of this invention is to reduce the pollution problems associated with the manufacture of sugar from sugar beets.

These and other objects and advantages of this invention will become apparent upon the reading of the following detailed description of this invention.

A BRIEF DESCRIPTION OF THE DRAWING

A preferred embodiment of this invention is illustrated in a schematic flow diagram in the accompanying drawing.

DETAILED DESCRIPTION OF THE INVENTION

Broadly, this invention involves the selective purification of sugar beet diffuser juice in which the colloidal and particulate material are first removed from the juice. The colloidal and particulate material removal is accomplished by first neutralizing the raw diffuser juice to minimize the formation of inverted sucrose and stabilize the colloidal and particulate material without precipitating the organic acids. This may be accomplished by the addition of NaOH to raise the pH to 6.5 or above. It is frequently desirable to heat the raw juice to a temperature from 85° – 100° C. either simultaneously or subsequently to the neutralization to decrease the insolubility of the protein in the juice. The next step involves separating the colloidal and particulate solids from the raw diffusion juice by centrifuging the juice at high accelerations greater than 10,000 times the force of gravity (abbreviated 10,000 g's) and preferably between 10,000 g's and 100,000 g's to form a clarified diffusion juice.

The clarified diffuser juice is then treated to remove or reduce the concentration of the organic acids, particularly citric acid, oxalic acid, malic acid, acetic acid and lactic acid and tartaric acid, succinic acid, formic acid, fumaric acid, butyric acid, and galacturonic acid. A small amount of CaO, or like calcium ion producing agent, is then added to the clarified diffuser juice to precipitate those organic acids that have low solubilities in a calcium salt water solution as shown below:

| ORGANIC ACID | Ca-SALT WATER SOLUBILITY |
|---|---|
| Citric Acid | 0.210g/100 ml. |
| Oxalic Acid | 0.0014g/100 ml. |
| Tartaric Acid | 0.0078g/100 ml. |
| Galacturonic Acid | insoluble |
| Malic Acid | 1.224g/100 ml. |
| Acetic Acid | 29.7g/100 ml. |
| Lactic Acid | 7.9g/100 ml. |
| Succinic Acid | 0.89g/100 ml. |
| Formic Acid | 18.4g/100 ml. |
| Fumaric Acid | 2.11g/100 ml. |
| Butyric Acid | 17.3g/100 ml. |

Theoretically the small amount of CaO added to the solution should be equal to the stoichometric equivalent of the organic acid ion content in the diffusion juice or a slight excess (up to 10 percent). However as a practical matter it is sufficient to add CaO in amounts between 0.1 percent to 3 percent by weight to the diffusion juice depending upon the quality of the juice and its organic acid concentration. Preferably the amount of CaO added should be between 0.1 percent and 0.3 percent by weight. The precipitated organic acids are removed from the diffusion juice by such separation means as centrifugation or filtration.

After the organic acids have been removed, other dissolved impurities may be removed from the juice by treating the clarified diffuser juice with additional (excess) lime and $CO_2$ prior the evaporation to destroy glucose and fructose formation.

The precipitated calcium salts of the organic acids are then treated with an aqueous solution, preferably of hot water; and a carbonate ion ($CO_3^{-2}$) generating agent such as $CO_2$ gas to liberate the organic acids and to precipitate calcium carbonate to separate the organic acids from the calcium ion. The calcium carbonate precipitate is then removed from the aqueous solution leaving the redissolved organic acids. The aqueous solution containing the dissolved organic acids is processed to separate or purify the organic acids or alternatively the aqueous solution containing the dissolved organic acids may be sold as a commodity to purchasers having specific facilities for the recovery of one or more of the organic acids. It may be desirable to soften the aqueous solution to remove the last traces of the calcium ion in an ion-exchange with sodium ions. After the calcium ions are removed, the organic acids may be separated and purified by conventional means, such as column chromatograph, distillation, steam distillation, selective solubility in various solvents, etc.

In terms of apparatus as illustrated in the accompanying drawing, the beets are first cut into cossettes by a slicer 10. The cossettes are then placed in a diffuser 12 and passed counter-current to a solvent (water) flowing to the diffuser 12 from a source 14. The sucrose depleted cossettes are then passed to a press 13 to reduce the water content of the cossettes below 80 percent for drying in a drier 15 to form a feed.

The screened diffusion juice emitted from the diffuser is directed into a neutralizing tank 17 in which sodium hydroxide (NaOH) is added to neutralize the juice to minimize the formation of inverted sucrose and to stabilize the colloids without precipitating the organic acids. Generally, the raw diffuser juice has a pH of between 6.2 and 6.5 and a temperature of between 60° and 75° C. The addition of sodium hydroxide raises the pH above 6.5. From the neutralizing tank the diffuser juice passes through a raw juice heater 18 to raise the temperature of the neutralized raw diffuser juice to a temperature between 85° C. and 100° C. to denature the soluble protein and decrease protein solubility in solution. The temperature may vary depending upon the juice quality. The heated neutralized diffuser juice is then passed on a continuous basis through a separator 20 such as a high capacity, high speed, solids-ejecting centrifuge to separate the colloidal and particulate material from the juice. Preferably, the juice is subjected to acceleration forces of between 10,000 g's and 100,000 g' s. For most production operations each solids-ejecting centrifuge should have a capacity of efficiently handling approximately 200 gpm.

From the separator 20 the clarified diffuser juice is passed to an organic acid precipitating tank 22 in which a liming agent in an amount between 0.1 percent and 3 percent by weight of the juice is added to precipitate those organic acids or a portion thereof that are relatively insoluble in a Ca-salt water solution. The calcium salts of the organic acids are separated from the juice in a separator 24 with the precipitated calcium salts passing to a carbonation and dissolving tank 28 and the sugar juice flowing to a lime-carbonation tank 26. In the tank 26, the juice is subjected to additional lime and $CO_2$ to prevent sucrose inversion before passing to evaporators to produce a thick juice in the production of beet sugar.

The calcium salts of the organic acids are subjected to hot water and $CO_2$ in the carbonation and dissolving tank 28 to free the organic acids and to precipitate most of the calcium in the form of calcium carbonate. The precipitated calcium carbonate is removed from the aqueous organic acid solution in a separator 30. It may be desirable to pass the aqueous organic acid solution through a softener 32 to remove any remaining calcium ions before selectively recovering or purifying the organic acids in a selective recovery unit 34.

The solids from the separator 20 pass to the drier 15 where the moisture is removed to form a salable high protein livestock feed.

As previously mentioned, in the conventional process the colloidal and particulate solids and organic acids are removed from the juice as part of the lime mud cake with no recovery of the organic acids or the colloidal solids other than as a source of fuel for the lime reclaiming kiln.

Furthermore, by utilizing this process a purer thin juice is obtained having less organic acid content than was customary in conventional processes. This not only decreases the evaporator scaling problem but also enables the recovery of some of the organic acids that traditionally ended up in the molasses.

It should be understood that the above described process may be varied to accommodate the needs of a particular installation and to suit local conditions and a wide variety of diffusion juice quality. Therefore, only the following claims are intended to define this invention.

What is claimed is:

1. In the manufacture of beet sugar, selective purification of an aqueous diffusion beet sugar juice containing colloidal and particulate impurities and at least one organic acid impurity that forms an insoluble calcium salt in an aqueous solution and recovery of the organic acid impurity, said process comprising the steps of:

selectively removing the colloidal and particulate impurities from the beet sugar juice without forming an insoluble calcium salt of the organic acid;

adding a liming agent to the clarified diffusion juice in an amount between 0.1 percent and 3 percent of the clarified diffusion juice by weight to form an insoluble calcium salt precipitate of the organic acid impurity;

removing the insoluble calcium salt precipitate of the organic acid impurity from the diffusion juice to purify the beet sugar juice; and contacting the insoluble calcium salt precipitate of the organic acid impurity with an aqueous solution and a carbonate ion ($CO_3^{-2}$) producing agent to form a calcium carbonate precipitate and to dissolve the organic acid impurity into the aqueous solution to recover the organic acid from the calcium salt.

2. In the process defined in claim 1 wherein the colloidal and particulate impurities are selectively removed from the juice by subjecting the colloidal and particulate impurities to centrifugal forces of between 10,000 g's and 100,000 g's.

3. In the process defined in claim 1 wherein the aqueous solution containing the redissolved organic acid is further processed to remove any remaining calcium ions.

4. In the process defined in claim 1 further comprising the step of treating the aqueous diffusion beet sugar juice with a pH adjusting agent to raise the pH of the juice above 6.5 prior to removal of the colloidal and particulate impurities without precipitating the organic acid.

5. In the process defined in claim 4 further comprising the step of heating the aqueous diffusion beet sugar juice to a temperature between 85° C. and 100° C. prior to removing the colloidal and particulate impurities.

* * * * *